United States Patent
B et al.

(10) Patent No.: US 10,592,183 B1
(45) Date of Patent: Mar. 17, 2020

(54) PRINTER SELECTION

(71) Applicant: Hewlett-Packard Development Company, L.P., Houston, TX (US)

(72) Inventors: Anil Datta Kumar B, Bangalore (IN); Ramesh Kumar Veerthineni, Bangalore (IN); Sekhar Muni Sirigiri, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/220,843

(22) Filed: Dec. 14, 2018

(51) Int. Cl.
  *G06F 3/12* (2006.01)
  *G03G 15/00* (2006.01)
  *G03G 21/02* (2006.01)
  *G06Q 30/02* (2012.01)
  *G06Q 30/06* (2012.01)

(52) U.S. Cl.
  CPC ....... *G06F 3/1292* (2013.01); *G03G 15/5075* (2013.01); *G03G 21/02* (2013.01); *G06F 3/1267* (2013.01); *G06F 3/1288* (2013.01); *G06Q 30/0283* (2013.01); *G06Q 30/06* (2013.01)

(58) Field of Classification Search
  CPC .... G06F 3/1292; G06F 3/1267; G06F 3/1288; G03G 15/5075; G03G 21/02; G06Q 30/0283; G06Q 30/06
  See application file for complete search history.

(56) References Cited

U.S. PATENT DOCUMENTS

| | | |
|---|---|---|
| 6,516,157 B1 | 2/2003 | Maruta et al. |
| 7,127,433 B2 | 10/2006 | Baker |
| 8,953,192 B2 | 2/2015 | Gutnik et al. |
| 9,036,184 B2 | 5/2015 | Liu |
| 2002/0165833 A1 | 11/2002 | Minowa et al. |
| 2004/0137855 A1 | 7/2004 | Wiley et al. |
| 2004/0249733 A1* | 12/2004 | Clough ............... G06Q 30/04 705/34 |
| 2005/0174609 A1 | 8/2005 | Thurlow |
| 2008/0030750 A1* | 2/2008 | Kato .................. G03G 21/02 358/1.4 |
| 2010/0238488 A1* | 9/2010 | Alaghband .......... G06F 3/1222 358/1.15 |
| 2012/0019867 A1* | 1/2012 | Prati .................. G06F 3/1204 358/1.15 |
| 2014/0368865 A1* | 12/2014 | Gutnik ............... G06F 3/1222 358/1.15 |
| 2017/0201647 A1* | 7/2017 | Neville ............... H04N 1/346 |
| 2017/0364326 A1 | 12/2017 | Chang et al. |

* cited by examiner

*Primary Examiner* — Sandra Brase
(74) *Attorney, Agent, or Firm* — HP Inc. Patent Department

(57) ABSTRACT

Examples disclosed herein relate to identifying a plurality of available printers associated with a printer sharing service, displaying, from the plurality of available printers, a sorted list of the plurality of available printers and a cost per page for each of the plurality of available printers, receiving a selection of a first printer of the plurality of available printers, and causing the first printer to print a print job.

13 Claims, 3 Drawing Sheets

PRINTER SELECTION

BACKGROUND

Multi-function devices often combine different components such as a printer, scanner, and copier into a single device. Such printers may receive print jobs from a variety of sources, such as direct cable connection, flash drives, and/or network connections such as Bluetooth, cellular, and/or WiFi connections.

Figure 1:
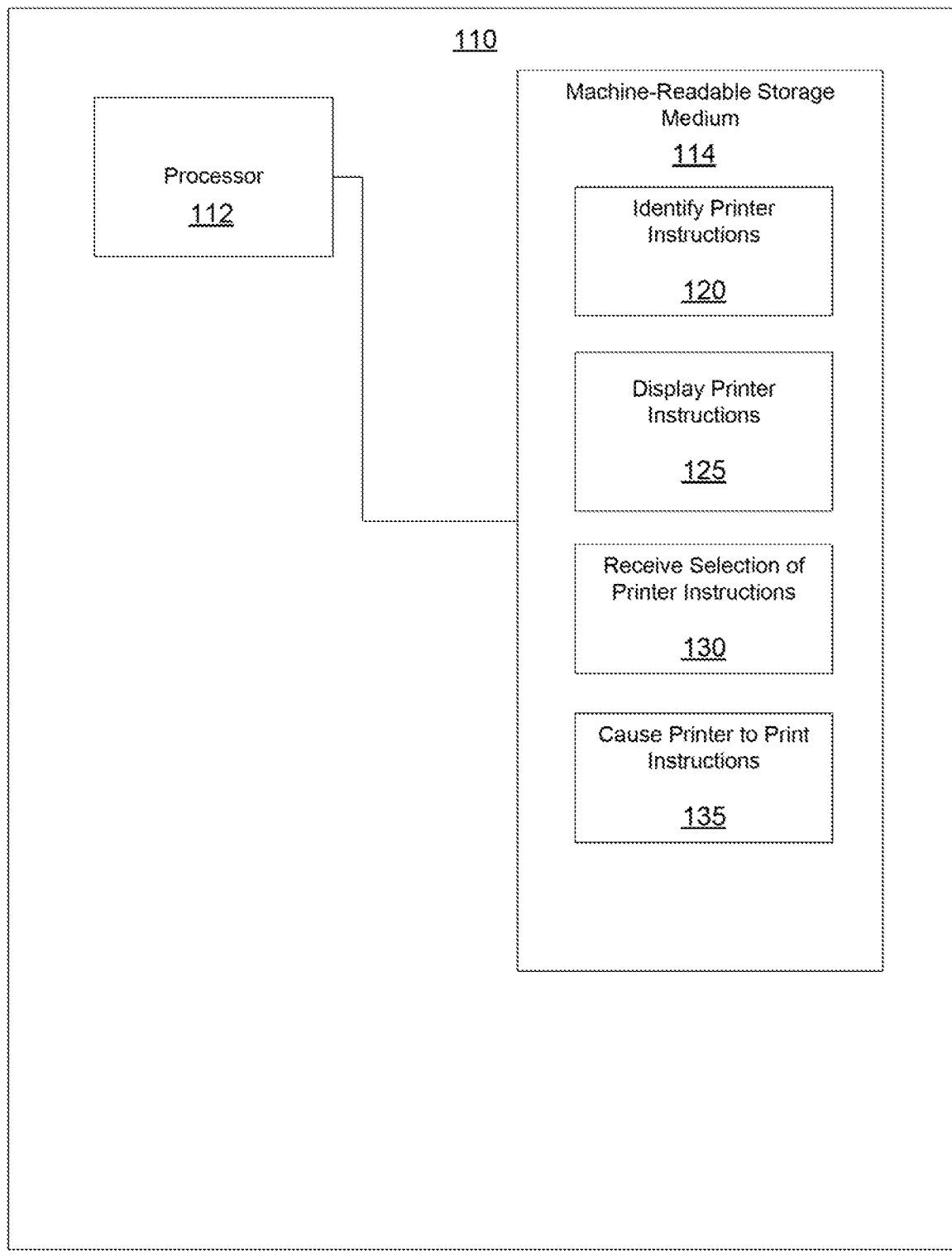
FIG. 1 is a block diagram of an example computing device for providing printer selection.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

Mobile applications allow users to access printers or other devices in multiple locations via a common user interface. For example, an app may allow a user to print from other apps on their smart phone to a shared print queue. This print queue may be stored on the smart phone and/or in the cloud and delivered to a nearby printer as the user approaches it. In many cases, the user can browse available printers at their leisure and pick one associated with their organization to print their documents.

For example, a user may be an employee of Company A, and may be visiting one of that Company's offices in another city. Company A's printers may be visible to the mobile app, regardless of office location, and nearby printers may be visible to the user even if the user has not installed those printers or used them before. For example, the app may be able to retrieve a directory of printers and/or detect nearby printers such as via WiFi, Near-Field Communication (NFC), and/or Bluetooth beacons.

In some implementations, a user may subscribe to a service that provides access to printers for a contracted and/or flexible price for each print job, such as a cost per page. For example, a university student may be provided with credits for printing a certain number of pages per month on some and/or all of a university's available printers. For another example, a business traveler may subscribe to a service that allows printing at a certain hotel chain's business center for a fixed cost per page.

A problem may arise for the user when they are not near one of the printers associated with their subscription service and/or other access program. A concurrent problem may arise for printer owners that may invest in a printer but not use it enough to justify the cost. In some implementations consistent with this disclosure, the printer owner may provide a way for users of a printer sharing service to locate and use their printer more efficiently. For example, the printer owner may register their printer with a sharing service. The service may assign a unique ID to the printer, such as an email address or other identifier such that the printer can be identified within an app associated with the sharing service. The owner may be provided with an average cost per page, such as a cost based on a consumable (e.g., ink, toner, additive material, paper, etc.) cost and/or may determine their own cost. The owner may also add in a margin for each page. For example, the cost to produce an average mono page on a laser printer may be 1.5 cents; the owner may add on an extra 1 cent such that pages printed via the sharing service credit the owner for 2.5 cents. In some implementations, pages may be tracked as credits. For example, a printer owner may receive a credit in the form of a count for each page printed on their printer. The owner may then be able to convert these page counts to a monetary payout and/or may use the credits to print their own documents in turn on another owner's printer.

FIG. 1 is a block diagram of an example computing device 110 for providing printer selection. Computing device 110 may comprise a processor 112 and a non-transitory, machine-readable storage medium 114. Storage medium 114 may comprise a plurality of processor-executable instructions, such as instructions 120 and instructions 125. In some implementations, instructions 120, 125 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute identify printer instructions 120, display printer instructions 125, receive selection of printer instructions 130, and cause printer to print instructions 135.

Executable instructions 120, 125, 130, 135 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Identify printer instructions 120 may identify a plurality of available printers. For example, device 110 may comprise a mobile device such as a smartphone, laptop, tablet, etc. In some examples, a user of device 110 may desire to print a document on standard paper media—other examples may include printing a 3D object using additive materials and/or printing latex on a vinyl media, among others. Instructions 120 may search for and/or retrieve a list of suitable printers for the given print job, such as a monochrome printout on letter size media. Suitable printers may comprise a number of factors that may vary in different implementations. For example, suitable printers may comprise those detectable by device 110, such as via Near-Field Communication (NFC) and/or Bluetooth beacons. Suitable printers may comprise those that are capable of producing the particular print job, such as those able to print in color and/or those with finishing capabilities such as stapling and/or duplexing.

In some implementations, the instructions 120 to identify the plurality of available printers may comprise instructions to select the plurality of printers from a database of printers based on a location criterion. For example, the user of device 110 may subscribe to a printer sharing service that provides access to printers at a variety of locations without having to purchase those printers. The location criterion may comprise, for example, printers available to subscribers of the service within a certain radius (e.g., 1 kilometer, 0.5 miles) and/or a defined geographic area (e.g., within an office building, etc.) of the user's location, such as may be determined by geolocation capabilities of device 110. The location criterion may be determined in other ways, such as by determining which network device 110 is operating on, such as a particular WiFi network and/or within a particular network domain, and identifying printers associated with that network.

In some implementations, the instructions 120 to identify the plurality of available printers may comprise instructions to select the plurality of printers from a database of printers based on a contract criterion. For example, the contract criterion may comprise an affiliation with a printer sharing service. The user may subscribe to the service at a level that only provides access to standard media rather than other types of media (e.g., plain white paper rather than color and/or heavy weight paper). The identification may filter out printers that do not meet the user's contract requirements.

Display printer instructions 125 may display, from the plurality of available printers, at least one printer of the plurality of available printers and a cost per page for a print job. For example, device 110 may display the list of printers on a screen via an application user interface. In some implementations, the instructions to display the at least one printer and the cost per page for the print job may comprise instructions to display the at least one printer in a list of the plurality of available printers sorted by distance and/or by the cost per page.

The cost per page may be calculated, for example, according to a print material cost, a printer owner margin, and/or a service fee. The print material cost, for example, may comprise a cost for a print substance, such as ink, toner, and/or additive materials and/or for a print substrate such as paper, media, latex, vinyl, build platforms, etc. The printer owner margin may be set by the owner and/or by the application. The service fee may be a portion of the cost per page retained by the printer sharing service.

Receive selection of printer instructions 130 may receive a selection of the at least one at least one printer. For example, the user may select one of the displayed printers via the user interface displayed on device 110.

Cause printer to print instructions 135 may cause the at least one printer to print the print job. For example, the print job may be caused to be printed according to the printer sharing service. The print job may be sent directly to the printer and/or may be relayed through another device, such as a cloud server. Rendering of the print job may similarly be performed by device 110, by the printer itself, and/or by another device, such as a remote server and/or cloud service. Instructions 135 may provide necessary information to the printer, such as account information to ensure that the print job is collected by the originating user. For example, the print job may be sent to the printer encrypted, and only decrypted and actually printed when the user arrives at the printer to release the print job, such as by entering a password and/or personal identification number (PIN).

Figure 2:
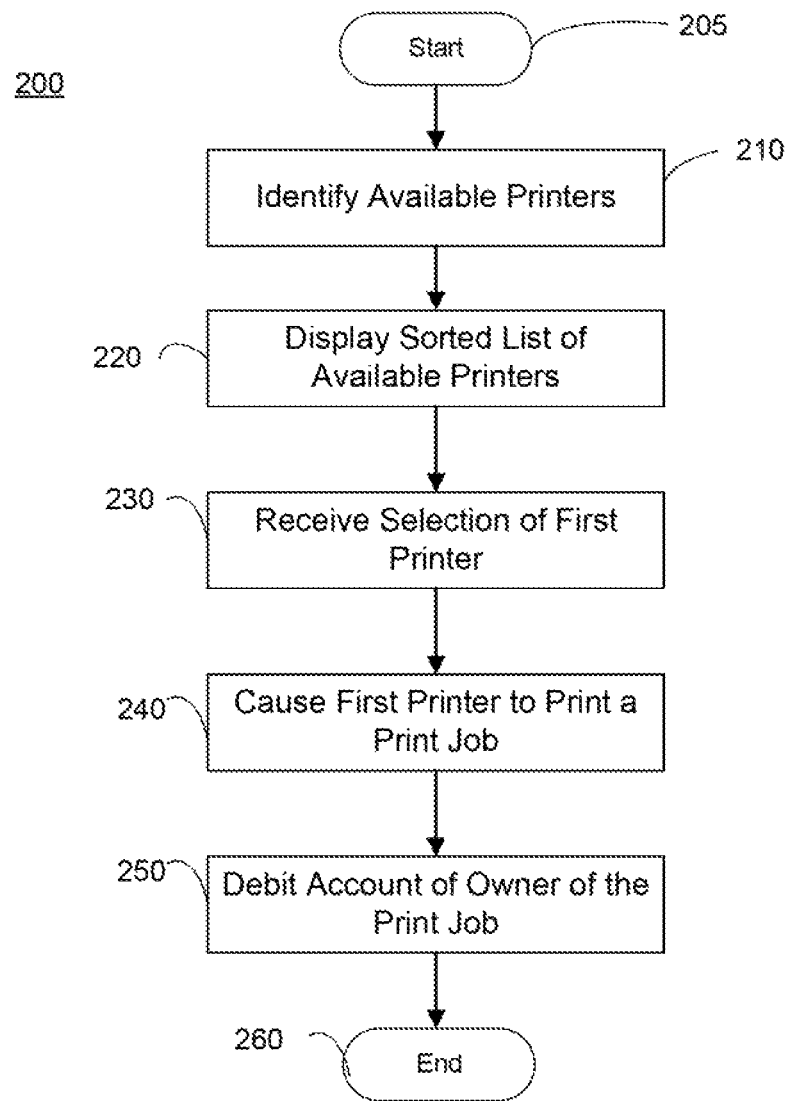
FIG. 2 is a flowchart of an example method for providing printer selection.

FIG. 2 is a flowchart of an example method 200 for printer selection. Although execution of method 200 is described below with reference to computing device 110, other suitable components for execution of method 200 may be used.

Method 200 may begin at stage 205 and advance to stage 210 where device 110 may identify a plurality of available printers associated with a printer sharing service. For example, device 110 may execute identify printer instructions 120 to identify a plurality of available printers. For example, device 110 may comprise a mobile device such as a smartphone, laptop, tablet, etc. In some examples, a user of device 110 may desire to print a document on standard paper media—other examples may include printing a 3D object using additive materials and/or printing latex on a vinyl media, among others. Instructions 120 may search for and/or retrieve a list of suitable printers for the given print job, such as a monochrome printout on letter size media. Suitable printers may comprise a number of factors that may vary in different implementations. For example, suitable printers may comprise those detectable by device 110, such as via Near-Field Communication (NFC) and/or Bluetooth beacons. Suitable printers may comprise those that are capable of producing the particular print job, such as those able to print in color and/or those with finishing capabilities such as stapling and/or duplexing.

In some implementations, the instructions 120 to identify the plurality of available printers may comprise instructions to select the plurality of printers from a database of printers based on a location criterion. For example, the user of device 110 may subscribe to a printer sharing service that provides access to printers at a variety of locations without having to purchase those printers. The location criterion may comprise, for example, printers available to subscribers of the service within a certain radius (e.g., 1 kilometer, 0.5 miles) and/or a defined geographic area (e.g., within an office building, etc.) of the user's location, such as may be determined by geolocation capabilities of device 110. The location criterion may be determined in other ways, such as by determining which network device 110 is operating on, such as a particular WiFi network and/or within a particular network domain, and identifying printers associated with that network.

In some implementations, the instructions 120 to identify the plurality of available printers may comprise instructions to select the plurality of printers from a database of printers based on a contract criterion. For example, the contract criterion may comprise an affiliation with a printer sharing service. The user may subscribe to the service at a level that only provides access to standard media rather than other types of media (e.g., plain white paper rather than color and/or heavy weight paper). The identification may filter out printers that do not meet the user's contract requirements.

Method 200 may then advance to stage 220 where computing device 110 may display, from the plurality of available printers, a sorted list of the plurality of available printers and a cost per page for each of the plurality of available printers. For example, device 110 may execute display printer instructions 125 to display, from the plurality of available printers, at least one printer of the plurality of available printers and a cost per page for a print job. For example, device 110 may display the list of printers on a screen via an application user interface. In some implementations, the instructions to display the at least one printer and the cost per page for the print job may comprise instructions to display the at least one printer in a list of the plurality of available printers sorted by distance and/or by the cost per page.

The cost per page may be calculated, for example, according to a print material cost, a printer owner margin, and/or a service fee. The print material cost, for example, may comprise a cost for a print substance, such as ink, toner, and/or additive materials and/or for a print substrate such as paper, media, latex, vinyl, build platforms, etc. The printer owner margin may be set by the owner and/or by the application. The service fee may be a portion of the cost per page retained by the printer sharing service.

In some implementations, the cost per page for each of the available printers may be determined for the print job. Different printers of the available printers may have different cost structures for different types of print jobs. For example, a color document print job may cost more per page than a monochrome print job among laser printers, but a color inkjet printer may have a lower cost per page than either a color or monochrome laser printer depending on the amount of page coverage. In other implementations, a cost per page may, for example, be averaged across many print jobs, with some jobs having an actual cost per page higher than the average cost per page and other print jobs having an actual cost per page lower than the average cost per page.

Method 200 may then advance to stage 230 where computing device 110 may receive a selection of a first printer of the plurality of available printers. For example, the user may select one of the displayed printers via the user interface displayed on device 110.

Method 200 may then advance to stage 240 where computing device 110 may cause the first printer to print a print job. For example, device 110 may execute cause printer to print instructions 135 to cause the at least one printer to print the print job. For example, the print job may be caused to be printed according to the printer sharing service. The print job may be sent directly to the printer and/or may be relayed through another device, such as a cloud server. Rendering of the print job may similarly be performed by device 110, by the printer itself, and/or by another device, such as a remote server and/or cloud service. Instructions 135 may provide necessary information to the printer, such as account information to ensure that the print job is collected by the originating user. For example, the print job may be sent to the printer encrypted, and only decrypted and actually printed when the user arrives at the printer to release the print job, such as by entering a password and/or personal identification number (PIN).

Method 200 may then advance to stage 250 where computing device 110 may debit an account associated with an owner of the print job. In some implementations, computing device 110 may further credit an account associated with an owner of the printer. These printer sharing service accounts may be different for the owner of the print job and the owner of the printer. For example, the print job owner's account may be debited the previously calculated cost per page for each page printed. The printer owner's account may be credited with the calculated cost per page for each page printed minus any service fee. The service fee, for example, may be charged on a per page and/or per print job basis.

Method 200 may then end at stage 260.

Figure 3:
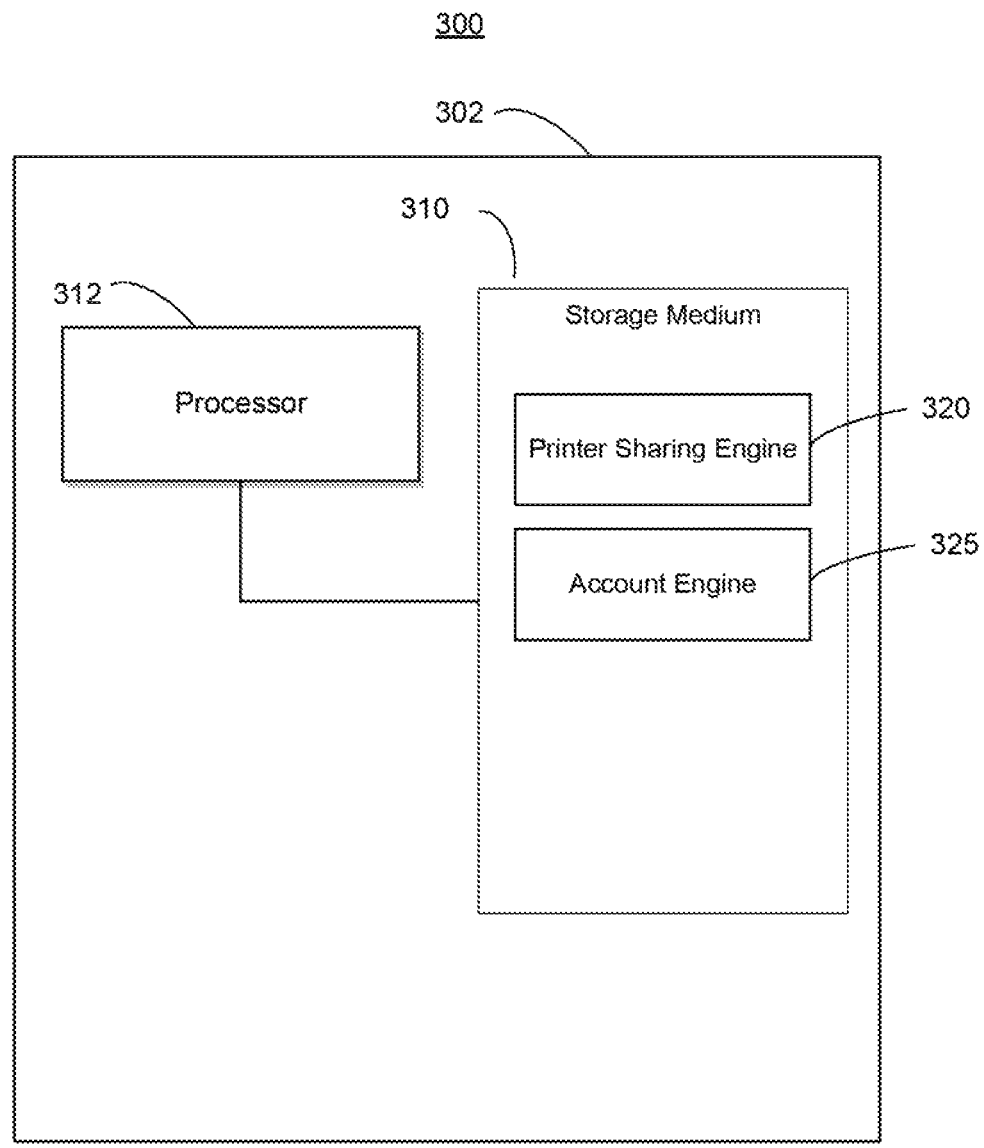
FIG. 3 is a block diagram of an example system for providing printer selection.

FIG. 3 is a block diagram of an example apparatus 300 for providing printer selection. Apparatus 300 may comprise a multi-function printer device 302 comprising a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a printer sharing engine 320 and an account engine 325.

Each of engines 320, 325 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325. In such examples, device 302 may comprise the machine-readable storage medium storing the instructions and the processing resource to execute the instructions, or the machine-readable storage medium may be separate but accessible to apparatus 300 and the processing resource.

Printer sharing engine 320 may identify a plurality of available printers associated with a printer sharing service, provide a list of the plurality of available printers and a cost per page for each of the plurality of available printers, receive a selection of a first printer of the plurality of available printer, and cause the first printer to print a print job.

Printer sharing engine 320 may, for example, execute identify printer instructions 120 to identify a plurality of available printers. For example, device 110 may comprise a mobile device such as a smartphone, laptop, tablet, etc. In some examples, a user of device 110 may desire to print a document on standard paper media—other examples may include printing a 3D object using additive materials and/or printing latex on a vinyl media, among others. Instructions 120 may search for and/or retrieve a list of suitable printers for the given print job, such as a monochrome printout on letter size media. Suitable printers may comprise a number of factors that may vary in different implementations. For example, suitable printers may comprise those detectable by device 110, such as via Near-Field Communication (NFC) and/or Bluetooth beacons. Suitable printers may comprise those that are capable of producing the particular print job, such as those able to print in color and/or those with finishing capabilities such as stapling and/or duplexing.

In some implementations, the instructions 120 to identify the plurality of available printers may comprise instructions to select the plurality of printers from a database of printers based on a location criterion. For example, the user of device 110 may subscribe to a printer sharing service that provides access to printers at a variety of locations without having to purchase those printers. The location criterion may comprise, for example, printers available to subscribers of the service within a certain radius (e.g., 1 kilometer, 0.5 miles) and/or a defined geographic area (e.g., within an office building, etc.) of the user's location, such as may be determined by geolocation capabilities of device 110. The location criterion may be determined in other ways, such as by determining which network device 110 is operating on, such as a particular WiFi network and/or within a particular network domain, and identifying printers associated with that network.

In some implementations, the instructions 120 to identify the plurality of available printers may comprise instructions to select the plurality of printers from a database of printers based on a contract criterion. For example, the contract criterion may comprise an affiliation with a printer sharing service. The user may subscribe to the service at a level that only provides access to standard media rather than other types of media (e.g., plain white paper rather than color and/or heavy weight paper). The identification may filter out printers that do not meet the user's contract requirements.

To provide the list of the available printers, printer sharing engine 320 may execute display printer instructions 125 to display, from the plurality of available printers, at least one printer of the plurality of available printers and a cost per page for a print job. For example, device 110 may display the list of printers on a screen via an application user interface. In some implementations, the instructions to display the at least one printer and the cost per page for the print job may comprise instructions to display the at least one printer in a list of the plurality of available printers sorted by distance and/or by the cost per page.

The cost per page may be calculated, for example, according to a print material cost, a printer owner margin, and/or a service fee. The print material cost, for example, may comprise a cost for a print substance, such as ink, toner, and/or additive materials and/or for a print substrate such as paper, media, latex, vinyl, build platforms, etc. The printer owner margin may be set by the owner and/or by the application. The service fee may be a portion of the cost per page retained by the printer sharing service.

To cause the printer to print, printer sharing engine 320 may execute instructions 135 to cause the at least one printer to print the print job. For example, the print job may be caused to be printed according to the printer sharing service. The print job may be sent directly to the printer and/or may be relayed through another device, such as a cloud server. Rendering of the print job may similarly be performed by device 110, by the printer itself, and/or by another device, such as a remote server and/or cloud service. Instructions 135 may provide necessary information to the printer, such as account information to ensure that the print job is collected by the originating user. For example, the print job may be sent to the printer encrypted, and only decrypted and actually printed when the user arrives at the printer to release the print job, such as by entering a password and/or personal identification number (PIN).

Account engine 325 may debit an account associated with an owner of the print job and credit an account associated with an owner of the printer. For example, the print job owner's account may be debited the previously calculated cost per page for each page printed. The printer owner's account may be credited with the calculated cost per page for each page printed minus any service fee. The service fee, for example, may be charged on a per page and/or per print job basis.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

What is claimed is:

1. A non-transitory machine readable medium storing instructions executable by a processor to:
   identify a plurality of available printers based on a contract criterion comprising an affiliation with a printer sharing service to which a user subscribes at a particular level governing access to which types of printers are available to the user;
   display, from the plurality of available printers, at least one printer of the plurality of available printers and a cost per page for a print job, the cost per page calculated according to a print material cost, a margin of a printer owner, and a service fee of a service provider maintaining the printer sharing service, the service provider different than the printer owner;
   receive a selection of the at least one at least one printer; and
   cause the at least one printer to print the print job.

2. The non-transitory machine readable medium of claim 1, wherein the instructions to identify the plurality of available printers comprise instructions to select the plurality of printers from a database of printers based on a location criterion.

3. The non-transitory machine readable medium of claim 1, wherein the print job is caused to be printed according to the printer sharing service.

4. The non-transitory machine readable medium of claim 1, wherein the instructions to display the at least one printer and the cost per page for the print job comprise instructions to display the at least one printer in a list of the plurality of available printers sorted by distance.

5. The non-transitory machine readable medium of claim 1, wherein the instructions to display the at least one printer and the cost per page for the print job comprise instructions to display the at least one printer in a list of the plurality of available printers sorted by the cost per page.

6. The non-transitory machine readable medium of claim 1, wherein the print material cost comprises a cost for a print substance.

7. The non-transitory machine readable medium of claim 1, wherein the print material cost comprises a cost for a print substrate.

8. The non-transitory computer-readable medium of claim 1, wherein the types of printers comprise a first type of printer that prints on plain paper, and a second type of printer that prints on paper other than plain paper.

9. A method comprising:
   identifying a plurality of available printers based on a contract criterion comprising an affiliation with a printer sharing service to which a user subscribes at a particular level governing access to which types of printers are available to the user;

displaying, from the plurality of available printers, a sorted list of the plurality of available printers and a cost per page for each of the plurality of available printers, the cost per page calculated according to a print material cost, a margin of a printer owner, and a service fee of a service provider maintaining the printer sharing service, the service provider different than the printer owner;

receiving a selection of a first printer of the plurality of available printers;

causing the first printer to print a print job; and debiting an account associated with an owner of the print job.

10. The method of claim 9, wherein the cost per page for each of the available printers is determined for the print job.

11. The method of claim 9, further comprising crediting an account associated with an owner of the printer.

12. The method of claim 9, wherein the account associated with the owner of the print job and the account associated with the owner of the printer comprise different accounts for the printer sharing service.

13. A system, comprising:

a printer sharing engine to:

identify a plurality of available printers based on a contract criterion comprising an affiliation with a printer sharing service to which a user subscribes at a particular level governing access to which types of printers are available to the user;

provide a list of the plurality of available printers and a cost per page for each of the plurality of available printers, the cost per page calculated according to a print material cost, a margin of a printer owner, and a service fee of a service provider maintaining the printer sharing service, the service provider different than the printer owner;

receive a selection of a first printer of the plurality of available printers; and cause the first printer to print a print job;

an account engine to:

debit an account associated with an owner of the print job, and credit an account associated with an owner of the printer.

* * * * *